US007062121B2

(12) United States Patent
Fitch et al.

(10) Patent No.: US 7,062,121 B2
(45) Date of Patent: Jun. 13, 2006

(54) METHOD AND APPARATUS FOR A SCALABLE PARALLEL COMPUTER BASED ON OPTICAL FIBER BROADCAST

(75) Inventors: Blake G. Fitch, White Plains, NY (US); Robert S. Germain, Larchmont, NY (US); Glen W. Johnson, Yorktown Heights, NY (US); Daniel M. Kuchta, Patterson, NY (US); Jeannine M. Trewhella, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 10/295,255

(22) Filed: Nov. 15, 2002

(65) Prior Publication Data

US 2004/0096147 A1 May 20, 2004

(51) Int. Cl.
*G02B 6/28* (2006.01)

(52) U.S. Cl. ............................ 385/24; 385/18; 385/31

(58) Field of Classification Search .................. 385/24
See application file for complete search history.

(56) References Cited

U.S. PATENT DOCUMENTS 4,696,062 A * 9/1987 LaBudde .................... 398/156
6,108,130 A * 8/2000 Raj ............................ 359/462
6,184,778 B1 * 2/2001 Tsuji ..................... 340/286.02
6,496,619 B1 * 12/2002 Naganuma ................... 385/27
6,764,651 B1 * 7/2004 Fernando et al. ........ 422/82.06
6,798,941 B1 * 9/2004 Smith et al. .................. 385/18
6,834,139 B1 * 12/2004 Prairie et al. ................. 385/24
2005/0111793 A1 * 5/2005 Grattan et al. ................ 385/37

* cited by examiner

*Primary Examiner*—Steven S. Paik
(74) *Attorney, Agent, or Firm*—Michael J. Buchenhorner; Casey P. August; Holland & Knight LLP

(57) ABSTRACT

An information processing system, includes several processors, each having at least one optical fiber input and at least one optical fiber output; a controller having an optical fiber input and at least one fiber output; fibers, bundled for transmitting information; and a fiber bundle redriver, coupled to the controller, having an input channel and an output channel, for simultaneously redriving an optical signal received from any selected one of the plurality of input fibers onto substantially all of the plurality of output fibers. The fiber output of each of the plurality of processors and the at least one fiber output of the controller are respectively is coupled to the input channel of the fiber bundle redriver, and the at least one fiber input of each of said plurality of processors and the fiber input of the controller are respectively coupled to the output channel of the fiber bundle redriver.

19 Claims, 7 Drawing Sheets

100

METHOD AND APPARATUS FOR A SCALABLE PARALLEL COMPUTER BASED ON OPTICAL FIBER BROADCAST

FIELD OF THE INVENTION

The invention disclosed broadly relates to the field of scalable computers, and more particularly relates to the field of fiber optics based scalable computers.

BACKGROUND OF THE INVENTION

Some organizations must deal with computational burdens which require the orchestrated efforts of tens of thousands of processors over months or years. These problems of scale are often described as "grand challenges" and require processing capabilities on the order of $10^{15}$ floating point operations per second ("PETAFLOPS"). Power needs on such a large scale require tremendous computing power distributed among a very large number of processors. In addition to the immense size and cost of the large number of machines involved, organizations are faced with the additional challenge of providing adequate and cost-efficient cooling for these machines.

For many applications, in particular molecular dynamics, the processors, once distributed, exhibit a pure broadcast gating communication pattern. A pure broadcast is one that reaches every destination node. Packets should not be lost, duplicated or re-ordered on the network.

Examples of such computational problems are those which are solved by "n-body," or "many-body" ("the problem of predicting the motions of three or more objects obeying Newton's laws of motion and attracting each other according to Newton's law of gravitation," from Dictionary of Scientific and Technical Terms, Fifth Edition, McGraw-Hill, Inc, 1994) computations such as planetary motion or molecular dynamics as applied to protein folding where the dominant computational burden is due to two-body interactions. In this class of problems, each atomic body has a spatial location which must be sent to every other atomic body at each time step where it is used to calculate the force between the two bodies. An example of such a problem is the simulation of the folding of a protein which might require 32,000 atomic bodies and $10^{12}$ time steps.

Another problem that can make use of pure broadcast is the brute force cryptographic attack, such as those used by the United States government in decrypting communications concerning national security. Currently, such attacks are often performed using many idle personal workstations and take very long periods of time.

Accordingly, it would be desirable and highly advantageous to have a fiber optics-based scalable computer capable of handling the above and other problems that have a very significant computational cost associated therewith.

SUMMARY OF THE INVENTION

An information processing system comprises a plurality of processors, a fiber bundle redriver and a controller for controlling the fiber bundle redriver. The controller is coupled to the redriver with at least one optical fiber input and at least one fiber output. The redriver simultaneously drives an optical signal received from any selected one of the plurality of processors through its input fiber onto substantially all of the plurality of processors through its output fibers.

These and other aspects, features and advantages of the present invention will become apparent from the following detailed description of preferred embodiments, which is to be read in connection with the accompanying drawings.

DESCRIPTION OF A PREFERRED EMBODIMENT

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPUs), a random access memory (RAM), and input/output (I/O) interfaces. The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

Because some of the constituent system components depicted in the accompanying figures may be implemented in software, the actual connections between the system components may differ depending upon the manner in which the present invention is implemented. Given the teachings herein, one of ordinary skill in the related art will be able to contemplate these and similar implementations or configurations of the present invention.

Figure 1:
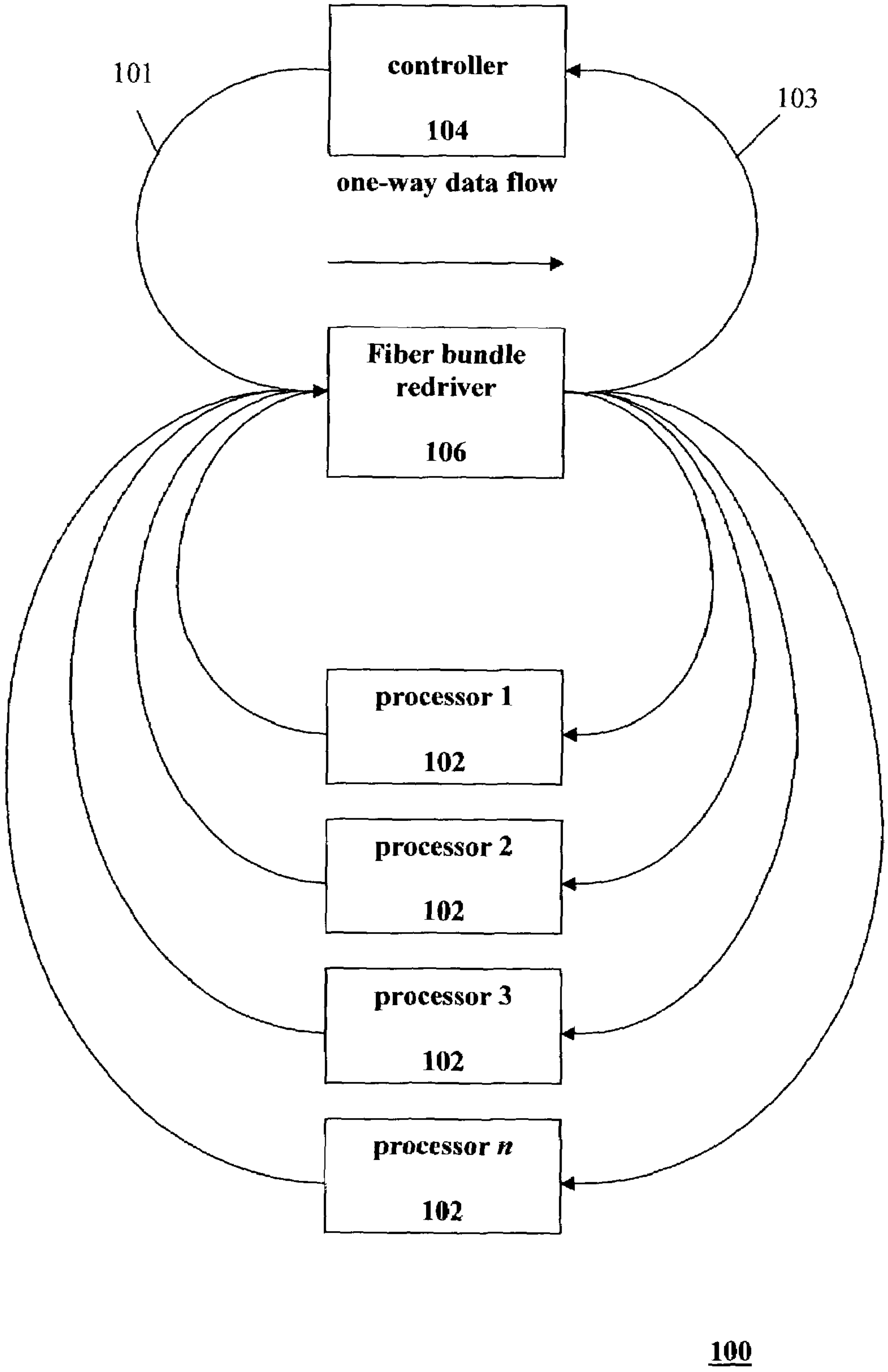
FIG. 1 is a block diagram illustrating a fiber optics based scalable computer, according to an illustrative embodiment of the invention.

Referring to FIG. 1, there is shown a block diagram illustrating a fiber optics based scalable computer 100. In preferred embodiments of the present invention, the computer 100 is employed for broadcast-based applications. However, one of ordinary skill in the related art will contemplate these and various other applications for the fiber optics based scalable computer of the present invention, while maintaining the spirit and scope thereof.

We will focus our examples on computer applications used in the area of molecular dynamics, and in particular, we will consider a computer architecture which targets a subclass of "grand challenges" characterized by a primary interprocessor communication pattern that is a pure broadcast. Because of the immense size and cost of the machines needed for these applications, the architecture described in the following examples of a preferred embodiment is based primarily on a single replicated component which enables the machines to be built and maintained efficiently. This architecture is flexible with regard to the physical layout and density of the components which enables the machines to be scaled up with a manageable cooling burden. Consequently, the computer 100 comprises a plurality of processors 102, a controller 104, and a fiber bundle redriver 106 controlled by the controller. The fiber bundle redriver 106 is a device which has a bundle of fibers on its input side and another bundle on its output side. The job of this device is to take any signal emanating from any fiber of the input side and redrive that signal into all the fibers on the output side simultaneously. The processors 102, as well as the controller 104 and the fiber bundle redriver 106, include fiber input/output channels for communications and/or power. It is to be appreciated that the exact number of each of the elements, and the exact number and type of channels respectively included therein, may be readily varied by one of ordinary skill in the related art while maintaining the spirit of the present invention.

The processors 102, along with their input and output channels, represent replicated components within the architecture of the computer 100. Preferably, the processors 102 are self-contained units which require power and two channels for communication. Therefore, according to one embodiment of the present invention, the processors 102 are packages, each with only two copper wires (+/−) for power and two fibers of the desired length for communication. In the illustrative embodiment, each of the processors 102 contain 1/nth of the processing power of the computer 100, where n is the number of processors to be built or included in the computer 100. Of course, other arrangements may be employed. The processors 102 may employ a unique interval identification number or address and may require the ability to load a program from its input fiber channel. Since the fibers are preferably of the same length, each processor 102 is likely to be mass produced as a unit. The fibers depicted in FIG. 1 do not appear to be all of the same length, but the preferred implementation will feature fibers of the same length.

The controller 104 is a common general purpose computer with a set of two fibers. The two fibers of the controller 104 are labeled input 101 and output 103 in the same manner as those of the above-described processors 102.

The assembly of the preceding elements is as follows. Gather all of the "in" fibers into a single bundle. Gather all of the "out" fibers into another bundle. Attach the output "bundle" to the input side of the fiber bundle redriver 106. Attach the "input" bundle to the output side of the fiber bundle redriver 106. Note that within a bundle each fiber may be anonymous. This is important because it may be impossible to create a dense bundle of fibers and retain any useful way to identify them.

Figure 2A:
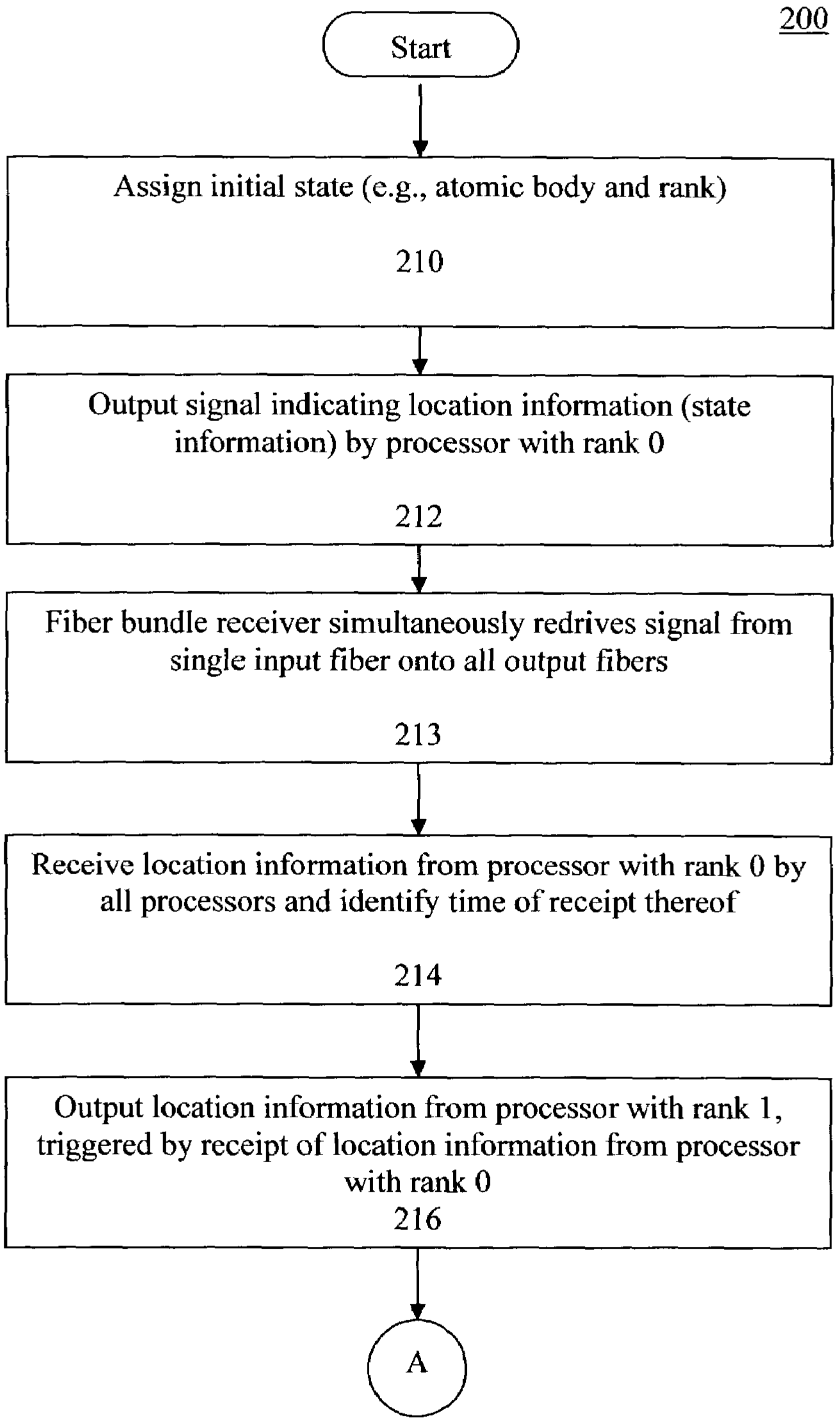
FIGS. 2A and 2B illustrate a method for self-synchronizing broadcasts issued by a fiber optics based scalable computer, according to an illustrative embodiment of the invention.
Figure 2B:
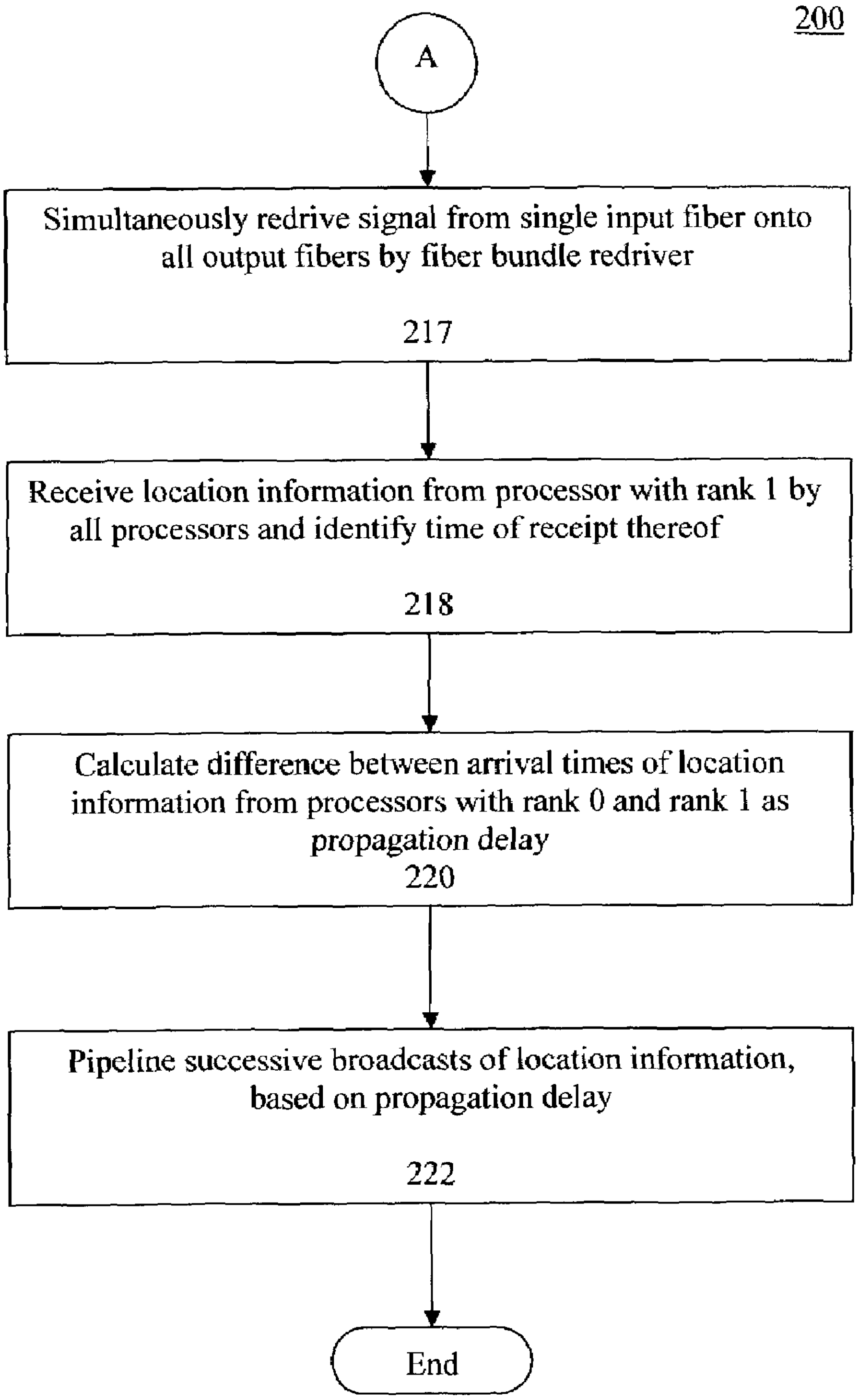

FIG. 2 shows a method for self-synchronizing broadcasts issued by a fiber optics based scalable computer, according to an illustrative embodiment of the present invention. While the method is described with respect to pure broadcast applications, it is to be appreciated that the method may be readily modified and employed for other applications (topologies). In fact, given the teachings of the present invention provided herein, one of ordinary skill in the related art will contemplate these and various other applications to which the method of FIG. 2 may be applied, while maintaining the spirit and scope of the present invention. It should be noted that pure broadcast can always implement other communication topologies; in such cases, however, there is generally some performance cost.

FIG. 2 uses the n-body problem, described earlier, to describe a method, according to a preferred embodiment. Each processor 102 handles the state information for one atomic body. At each time step, each processor will need to receive the location of the atomic bodies being handled by every other processor in the simulation. Since the computer 100 uses a pure broadcast emulation, each processor will have to send its own location only once, at the right moment, and every other processor will have that information. This is accomplished by using the fiber bundle redriver 106, as follows:

When the program starts to run, each processor 102 has been given its initial state, including the atomic body and a logical rank (step 210). Every processor except that processor with the first rank, for example rank 0, begins waiting for the location information from the processor with rank 0. The processor with rank 0 outputs its current location down its "output" fiber channel (step 212). This propagates down that single fiber which (physically) joins all the other "output" fibers as a bundle on the "input" side of the fiber bundle redriver 106. The fiber bundle redriver 106 takes the signal coming in on that single fiber and simultaneously drives the signal onto all or substantially all (e.g., one or more fibers may be omitted for predefined purposes, defects, and so forth) the fibers on its "output" side (step 213). The signal now propagates toward every processor on its "input" fiber.

When the signal arrives at the processors, each processor now has the location information of the rank 0 atomic body which is used to compute the force between the receiving node, or processor 102, and rank 0. The processor with rank 1 can now send its location. During an application time step, each node, processor 102, broadcasts the position of its atom and every other node computes the force between its own atoms and those whose positions are arriving.

Note that the above method is self-synchronizing. The processor 102 associated with rank 1 does not send its information until it receives the input from rank 0 and so forth. The problem with this is that the program is slowed by the propagation delay through the fiber optic channels. Accordingly, the following steps of the method of FIG. 2 allow the broadcasts by the processors to be self-synchronized so as to eliminate the effect of propagation delay on the n-body computation as a whole.

The propagation delay between the broadcast of the location information by one processor 102 and its receipt by all other processors 102 can be calibrated as follows.

At the time that each processor 102 receives the atomic body location information from the processor 102 with rank 0, each processor 102 notes the time when the information from rank 0 arrived (step 214). The processor 102 with rank 1 immediately outputs its information, triggered by the arrival of the information from the processor 102 with rank 0 (step 216). The fiber bundle redriver 106 takes the signal coming in on its single "input" fiber and simultaneously drives the signal onto all or substantially all the fibers on its "output" side (step 217). The signal now propagates toward every processor 102 on each processor's "input" fiber.

All of the processors will subsequently receive the atomic body location information from rank 1 and each of the processors 102 records the time (step 218). The difference between the arrival time of the information from rank 0 and rank 1 is calculated as the propagation delay (step 220), which is determined by the length of the fiber as well as the redriver delay times.

Given the propagation delay, successive broadcasts of location information can be pipelined on the fiber communication channel (step 222). The maximum depth of the pipeline is determined by the ratio of the propagation delay to the time extent of each location packet.

It is then determined whether or not the maximum depth of the pipeline is greater than 1. That is, step 222 determines whether the propagation delay is larger than the packet extent. The packet extent is the physical length of a packet as it moves along the fiber. If step 222. determines that the propagation delay is larger than the packet extent, then the transmission of the rank N location information can be timed relative to the receipt of the rank N—pipeline location information. This makes the computer 100 immune to synchronization problems caused by long term clock skew since the processors 102 are effectively resynchronized with the receipt of each location packet. However, if the propagation delay is not larger than the packet extent, then more complex timing is required to achieve full bandwidth. That is, each node will have to predict when its time slot will occur and start sending even though the preceding rank information (from current rank—1) may not have arrived yet.

No matter how long the fibers are, as long as they are all the same length, the system can pipeline the data within the fiber propagation delay time. Thus, the application will realize nearly the optimal limit of the fiber channel's bandwidth.

A description of some implementation options will now be given. For example, if it is found that more bandwidth is required than a single fiber can handle, then multiple fibers could be used. Also, multiple redrivers could be used, with a corresponding increase in the difficulty of programming the corresponding topology. Additionally, other logical topologies could be implemented, including point-to-point communications. The exact floating point capabilities of the processors 102 and the transmission bandwidth of the fiber connections are determined by the state of the art. It may be desirable to build what is the equivalent of many microprocessors into the replicated processor 102 of the computer 100 to reach very high processing rates. Given the teachings of the present invention provided herein, one of ordinary skill in the related art will contemplate these and various other configurations and implementations of the elements of the present invention, while maintaining the spirit and scope thereof.

A brief description of a related problem in implementing a fiber optics based scalable computer will now be given. One implementation problem is obtaining sufficient optical power from one source of data to communicate simultaneously with a very large number of receivers, such as 32,000 (32K) receivers as used in the molecular dynamics example. Each processor would optimally comprise one receiver and one transmitter. To keep the receiver design simple (i.e., to minimize circuit space by not requiring too many gain stages to boost the signal up to logic levels), the receiver should be driven by as much optical power as is practically possible.

Working backwards from the receiver, 10 μW (microwatts) is the target for the minimum received optical power. Presuming coupling losses of 10 dB (decibels) in the optical path, then the source should broadcast 3.2W (watts) at a level of 10 μW×10×32,000 of modulated optical power. There are several ways to achieve the 3.2W optical power level.

Figure 3A:
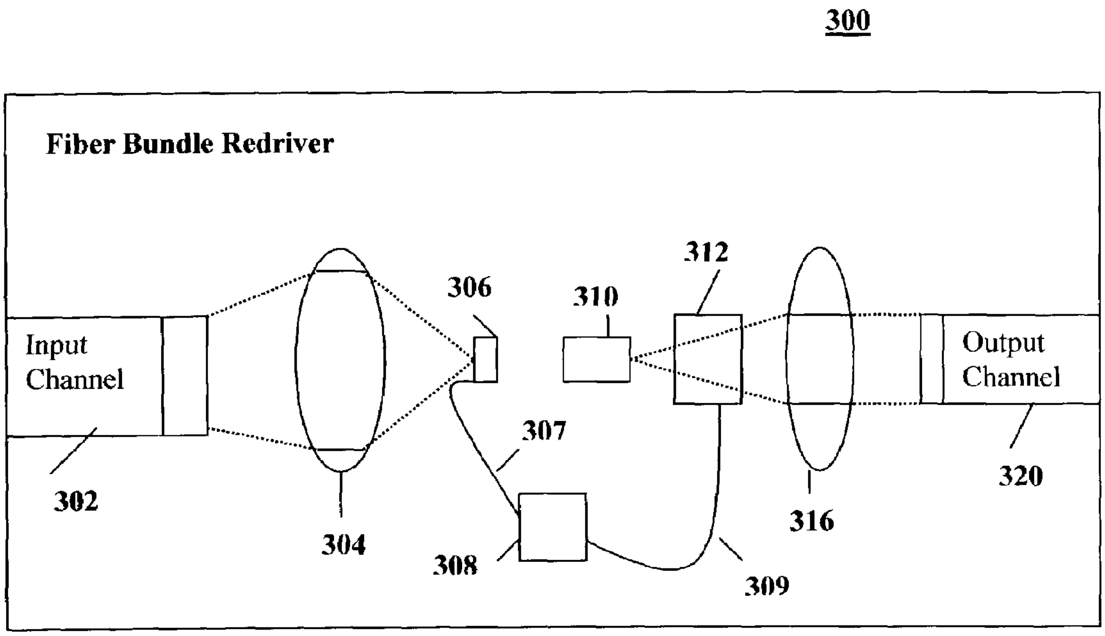
FIG. 3A is a diagram illustrating the fiber bundle redriver of FIG. 1, according to an illustrative embodiment of the invention.
Figure 3B:
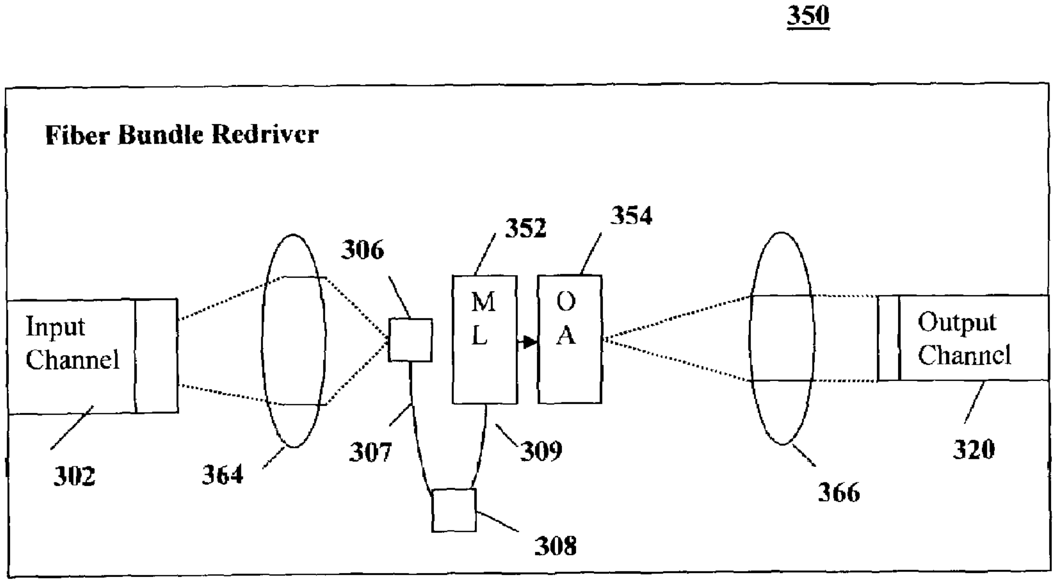
FIG. 3B is a diagram illustrating another embodiment of the fiber bundle redriver of FIG. 1.
Figure 3C:
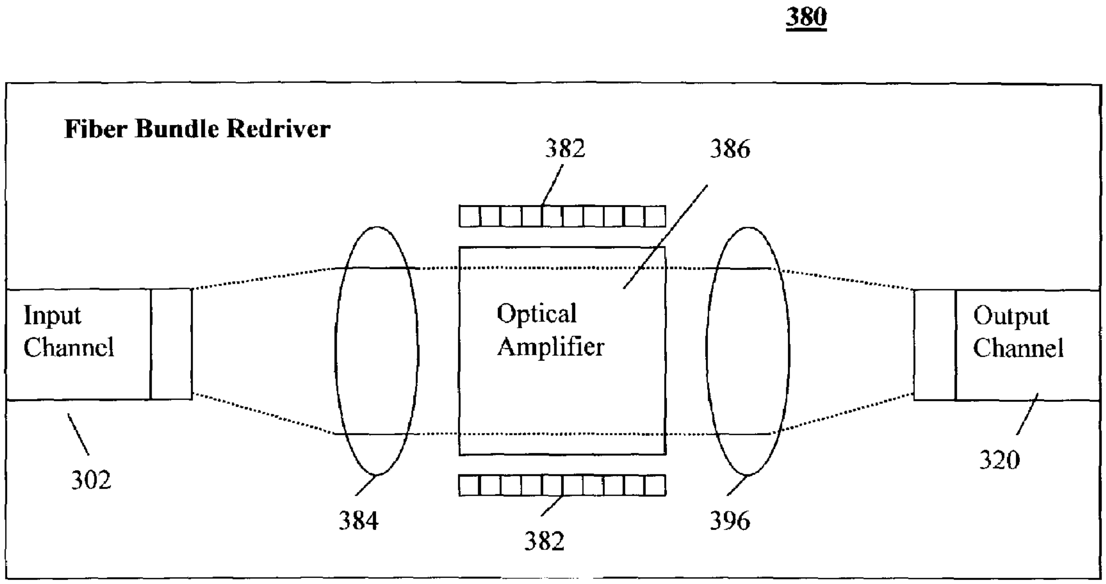
FIG. 3C is a diagram further illustrating the fiber bundle redriver of FIG. 1, according to another illustrative embodiment of the invention.

FIGS. 3A, 3B and 3C illustrate three possible embodiments of the fiber bundle redriver 106 of FIG. 1. It should be noted that other embodiments can be contemplated within the spirit and scope of the invention.

FIG. 3A shows a first embodiment 300 for obtaining the above-specified optical power level. This embodiment uses the fiber bundle redriver 106 including, as described from input to output: a first lens system 304; a photo detector 306; an amplifier driver 308; a continuous wave (CW) laser 310; an optical modulator 312; and a second lens system 316. An electrical signal 307 runs from the photo detector 306 through the amplifier driver 308. An electrical signal 309, which has been conditioned to drive a modulator, connects the amplifier driver 308 to the optical modulator 312. The first lens system 304 is coupled to the fiber input channel 302 of the fiber bundle redriver 106, and the second lens system 316 is coupled to the fiber output channel 320 (e.g., array of 32 k fibers) of the fiber bundle redriver 106.

The modulator 312 is, preferably, but not necessarily, a Lithium Niobate modulator. Of course, other types of modulators may be used, while maintaining the spirit and scope of the present invention.

Referring to FIG. 3B we see another example 350 of how a fiber bundle redriver 106 can be configured. FIG. 3B is very similar to FIG. 3A and has many of the same components, such as the input channel 302, the photo detector 306, the amplifier driver 308, the electrical signals 307 and 309, and the output channel 320. This configuration differs from FIG. 3A in that the CW laser 310 is replaced with a modulated 32 mW laser 352 ("ML" in box) and the lens systems 304 and 316 from FIG. 3A have been replaced with lens systems 364 and 366. The electrical signal 309 is received by the laser 352. The laser's optical output is run through a 20 dB optical amplifier 354 ("OA" in box) before being imaged through the second lens system 366 into the output channel 320. It should be noted that the two lens systems 364 and 366 in this example would differ in design from the two lens systems 304 and 316 in FIG. 3A because the optics have very different constraints and hence design points.

FIG. 3C shows a third embodiment 380 for obtaining the above-specified power level, involving the use of the fiber bundle redriver 106 including, as described from input to output, a first lens system 384; an optical amplifier section 386; an array of lasers 382 for pumping the amplifier sections; and a second lens system 396. In the illustrative embodiment of FIG. 3C, the first lens system 384 is coupled to the fiber input channel 302 of the fiber bundle redriver 106, and the second lens system 396 is coupled to the fiber output channel 320 (e.g., array of 32K fibers) of the fiber bundle redriver 106. In this case, each laser within the processor 102 needs to modulate 3.2 mW, which is practical.

In FIG. 3C, the optical signal from the input fiber bundle 302 of the fiber bundle redriver 106 is focused onto the (large area) optical amplifier 386 using the first lens system 384. The amplified optical signal is then redistributed to the output fiber bundle 320 of the fiber bundle redriver 106 using the second lens system 396. The large area optical amplifier 386 may be implemented with an Erbium doped glass rod of appropriate diameter which is pumped transversely to its long axis by an array of 980 nm diode pump lasers 382, in the same manner that a diode pumped Yttrium Arsenic Gallium (YAG) laser is built except that the laser cavity and mirrors are removed so that the pumped rod can be used as an amplifier. Such a configuration allows the rod diameter to be much larger than a fiber and better suited to collect the input from 1 of 32K transmitters. Preferably, but not necessarily, the optical amplifier 386 is an Erbium doped fiber amplifier (EDFA). Of course, other types of optical amplifiers may be used, while maintaining the spirit and scope of the present invention.

Figure 4:
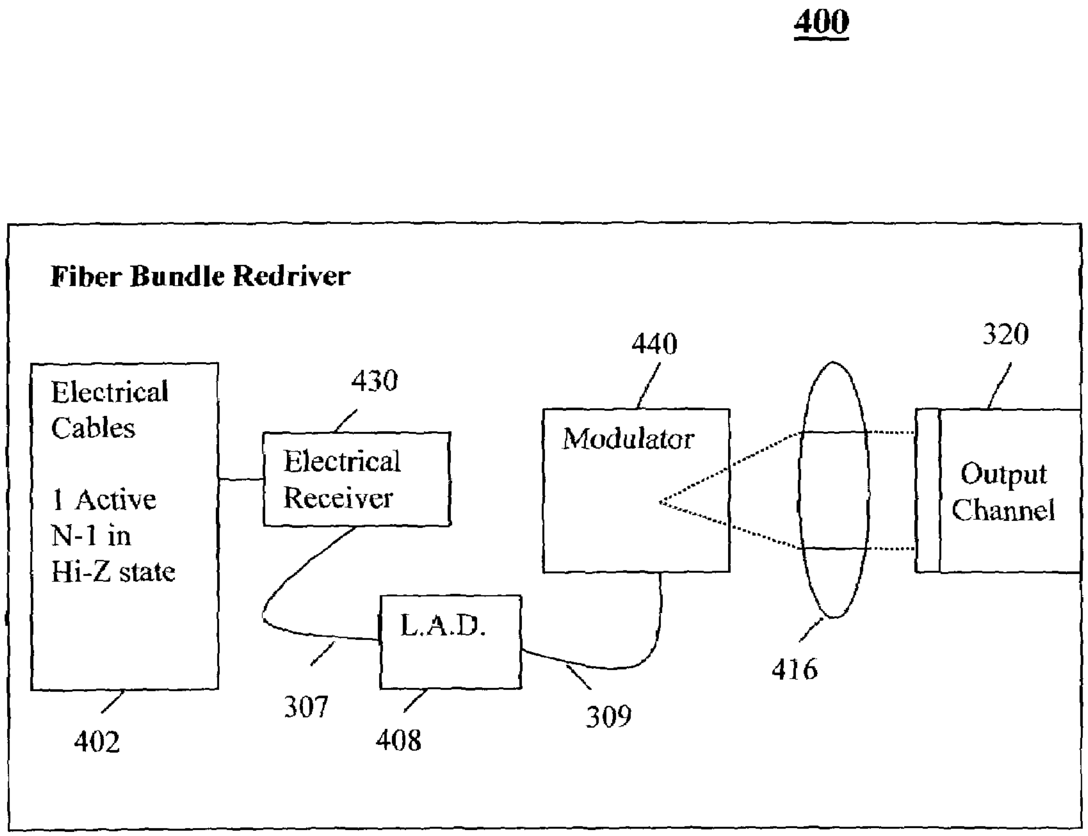
FIG. 4 is a diagram further illustrating the fiber bundle redriver of FIG. 1, according to another illustrative embodiment of the invention.

Referring now to FIG. 4 we see a configuration 400 representing another embodiment of the fiber bundle redriver 106 wherein a single modulated laser or fiber modulator is used to communicate with a large number (e.g., 32K) of receivers. The basic processing element 102 described above with respect to FIG. 1 is modified to have one fiber input and one electrical output. The fiber bundle redriver 106 is modified in FIG. 4 to have an electrical bus input 402 and a fiber bundle output. The electrical input 402 drives a bus (or transmission line) with N electrical cables, where "N" is the number of processors 102. One electrical cable (transmitter) is active and N−1 other transmitters are in Hi-Z (high-impedance) state. Since the bus has only one receiver 430 (one load), the classic problem of driving a large bus capacitance is avoided and the power dissipation is reduced while the speed is kept high.

Additionally one has a laser amplifier driver 408, which receives a signal 307 from the receiver 430, and a single laser modulator 440. This laser modulator could be configured in different ways. It could be composed of a continuous wave (CW) laser 310, paired with a Lithium Niobate optical modulator 312, such as in FIG. 3A. Optionally, it could be configured from a modulated 32 mW laser 352 paired with a 20 dB optical amplifier 354, as shown in FIG. 3B. These are just two examples of possible embodiments which could be contemplated within the spirit and scope of this invention. The signal 309 runs from the laser amplifier driver 408 to the modulator 440. Only one lens system 416 is needed in this configuration, focusing a beam onto the output channel 320.

In the case where the basic processing element does require two fibers (one in, one out), then the problem is one of amplifying 1 of 32K sources up to a high enough power level to be distributed to 32K receivers because it is not practical to modulate a single source at the required power (>3.2W).

The choice between the four preceding approaches depends on available electronics and power dissipation requirements. Modulators need large voltage swings and lasers that modulate 32 mW need large current swings. Another issue is that commercially available EDFAs are very bulky and some custom EDFA design is probably warranted. However, given the teachings of the present invention provided herein, one of ordinary skill in the related art will readily contemplate these and various other implementations and configurations of the elements of the present invention, while maintaining the spirit and scope thereof.

Another embodiment of the fiber bundle redriver 106 could be implemented by taking the output of the fiber bundle, fabricated much the same way as is done today in manufacturing endiscope cables, (32,000-70 micron diameter fibers bundled to 0.5 inch diameter cable) and focusing it down onto a high speed photo detector. The magnification of a lens system would have to be 1/250 times to focus the entire bundle onto one 50 micron photo detector. Another possible embodiment would use an array of smaller detectors and a lower magnification (1/50) optical system or a larger photo detector. The size of the photo detector will determine, in part, the sensitivity achievable at a given speed.

With respect to the fiber bundle redriver 106 according to FIG. 3A, the signal (e.g., photo current) produced by the photo detector 306 is amplified by the amplifier 308. The amplifier 308 may be, for example, an integrated circuit or an external amplifier. This signal is used to drive the modulator 312 which modulates a much higher power laser 310. The modulated light from the high power laser 310 is collimated with the lens systems 316 at a spot size to match the output fiber bundle 320 of the fiber bundle redriver 300. The modulator 312 is required because the laser power required is too high (>3.2W) to be practical as a directly modulated source.

Referring again to FIG. 1, each processor 102 modulates a medium power light source, such as a light-emitting diode (LED) or laser, depending on the data rate (frequency of data transfer).

Another possibility is to make a multimode EDFA using a large core fiber, for example, a 200–900 μm diameter core glass fiber that is Erbium-doped. This multimode fiber could be either transversely pumped (e.g., similar to a diode-pumped YAG) or longitudinally pumped (e.g., similar to a conventional EDFA). An objective is to increase the cross section of the gain element (amplifier) to be greater than the current 9 μm diameter, to enable an easier design of a lens system for coupling into one of the 32K fibers.

Given the teachings of the present invention provided herein, other implementations can be readily contemplated by one of ordinary skill in the related art in which smaller groups (i.e. 1K) of transmitters are bundled (coupled) to smaller diameter amplifiers (e.g., the 200 μm diameter multimode fiber type)×32 and the output of the array of amplifiers illuminates the input of the 32K receiving fibers.

The present invention is not restricted or limited to Erbium doping and, thus, other rare earth or other types of dopants (doping agents) can be used to create gain at other wavelengths, while maintaining the spirit and scope of the present invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An information processing system, comprising: a plurality of processors, each having at least one optical fiber input and at least one optical fiber output; a controller having at least one optical fiber input and at least one fiber output; a plurality of fibers, bundled for transmitting information; and a fiber bundle redriver, coupled to the controller, having an input channel and an output channel, for simultaneously redriving an optical signal received from any selected one of the plurality of input fibers onto substantially all of the plurality of output fibers, wherein the at least one fiber output of each of the plurality of processors and the at least one fiber output of said controller are respectively coupled to the input channel of the fiber bundle redriver, and the at least one fiber input of each of said plurality of processors and the at least one fiber input of said controller are respectively coupled to the output channel of the fiber bundle redriver.

2. The information processing system of claim 1, wherein the system is configured for broadcast-based applications.

3. The information processing system of claim 1, wherein each of the plurality of processors comprises 1/Nth of the processing power of the computer, where N is the number of processing units in a fiber optics based scalable computer.

4. The information processing system of claim 1, wherein the fibers coupled between the fiber bundle redriver and the plurality of processors are all of the same length.

5. The information processing system of claim 1, wherein the fiber bundle redriver comprises: at least one photo detector for converting an incoming optical beam into a digital electrical signal; a laser for producing an optical output; a modulator for modulating the optical output from said laser based on the digital electrical signal; and a lens system for coupling the modulated optical output to the plurality of output channels of said fiber bundle redriver.

6. The information processing system of claim 5, wherein said fiber bundle redriver further comprises another lens system for focusing the incoming optical beam onto the at least one photo detector.

7. The information processing system of claim 5 further comprising an amplifier, disposed between said at least one photo detector and said modulator for amplifying the digital electrical signal.

8. The information processing system of claim 5, further comprising a fiber amplifier coupled between said modulator and said lens system for amplifying the modulated optical output.

9. The information processing system of claim 8, wherein said fiber amplifier is an Erbium doped fiber amplifier.

10. The information processing system of claim 1 wherein the modulator comprises a Lithium Niobate modulator.

11. The information processing system of claim 1, wherein said fiber bundle redriver comprises: a lens system for focusing an incoming optical beam; a large area optical amplifier for amplifying the focused incoming optical beam; an array of pump lasers for pumping said large area optical amplifier; and another lens system for coupling the amplified, focused, incoming optical beam to the plurality of output channels of said fiber bundle redriver.

12. The information processing system of claim 11, wherein said large area optical amplifier is an Erbium doped glass rod.

13. The information processing system of claim 12, wherein a diameter of the Erbium doped glass rod is larger than a diameter of the plurality of input fibers of said fiber bundle redriver.

14. The information processing system of claim 12, wherein said large area optical amplifier is a multimode Erbium doped fiber amplifier comprising a core fiber that is Erbium doped.

15. The information processing system of claim 14, wherein a range of a diameter of the core fiber is from 200 to 900 .mu.m.

16. The information processing system of claim 14, wherein a range of a diameter of the core fiber is greater than 900 .mu.m.

17. The information processing system of claim 11, wherein said large area optical amplifier has a longitudinal axis, and said array of pump lasers pumps said large area optical amplifier transversely with respect to the longitudinal axis.

18. The information processing system of claim 11, wherein said large area optical amplifier has a longitudinal axis, and said array of pump lasers pumps said large area optical amplifier along the longitudinal axis.

19. A method for self-synchronizing transmissions between a plurality of processors comprised in a computer having a fiber bundle redriver, the fiber bundle redriver for simultaneously redriving a signal received from each of the plurality of processors to substantially all of the plurality of processors, the method comprising the steps of: initializing each of the plurality of processors, including the step of respectively assigning a logical rank thereto; outputting a current state of a lowest ranking one of the plurality of processors; identifying a time of receipt of the current state from the lowest ranking one of the plurality of processors, by each of the plurality of processors; outputting the current state of a next lowest ranking one of the plurality of processors, in response to a receipt of the current state from the lowest ranking one of the plurality of processors; and identifying the time of receipt of the current state, from the next lowest ranking one of the plurality of processors, by each of the plurality of processors; calculating a propagation delay as a difference between the time of receipt of the current state by the lowest ranking one of the plurality of processors and the time of receipt of the current state by the next lowest ranking one of the plurality of processors; and pipelining subsequent outputs of the current state by each of the plurality of processors in rank order based on the propagation delay.

* * * * *